US012801499B2

(12) United States Patent
Kuleshov et al.

(10) Patent No.: US 12,801,499 B2
(45) **Date of Patent: *Nov. 17, 2026**

(54) SYSTEMS AND METHODS FOR PERFORMING DATA BACKUPS USING A PERSISTENT CACHE

(71) Applicant: Acronis International GmbH, Schaffhausen (CH)

(72) Inventors: Andrey Kuleshov, Belgrade (RS); Yuri Per, Netanya (IL); Serg Bell, Singapore (SG); Stanislav Protsaov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 19/181,506

(22) Filed: Apr. 17, 2025

(65) Prior Publication Data

US 2026/0161511 A1 Jun. 11, 2026

Related U.S. Application Data

(63) Continuation of application No. 18/480,786, filed on Oct. 4, 2023, now Pat. No. 12,339,746.

(51) Int. Cl.

| | |
|---|---|
| ***G06F 11/1446*** | (2026.01) |
| ***G06F 16/11*** | (2019.01) |
| ***G06F 16/16*** | (2019.01) |
| ***G06F 16/172*** | (2019.01) |

(52) U.S. Cl.

CPC ........ *G06F 11/1451* (2013.01); *G06F 16/113* (2019.01); *G06F 16/166* (2019.01); *G06F 16/172* (2019.01)

(58) Field of Classification Search

CPC .. G06F 11/1451; G06F 16/113; G06F 16/166; G06F 16/172

See application file for complete search history.

(56) References Cited

U.S. PATENT DOCUMENTS

| | | | |
|---|---|---|---|
| 9,075,819 | B1 | 7/2015 | Escabi, II et al. |
| 9,652,405 | B1 * | 5/2017 | Shain .................. G06F 11/1441 |
| 9,811,276 | B1 * | 11/2017 | Taylor ................... G06F 3/0688 |
| 10,146,616 | B1 | 12/2018 | Shilane et al. |
| 11,474,699 | B1 * | 10/2022 | Saha ..................... H04L 9/0643 |
| 12,045,199 | B1 * | 7/2024 | Sorenson, III ........ G06F 16/172 |
| 12,254,180 | B2 * | 3/2025 | Madan .................... G06F 3/061 |
| 2018/0349424 | A1 * | 12/2018 | Gurajada .............. G06F 3/0604 |
| 2019/0188085 | A1 | 6/2019 | Slater et al. |

(Continued)

*Primary Examiner* — Huawen A Peng

(74) *Attorney, Agent, or Firm* — ArentFox Schiff LLP; Michael Fainberg

(57) ABSTRACT

A system generates a persistent cache in a volume of a computing device and setting a maximum size of the persistent cache. The system stores at least one archive metadata page of a plurality of archive metadata pages in the persistent cache. The system detects that the maximum size is reached subsequent to storing the at least one archive metadata page. In response to detecting that the maximum size is reached, the system identifies at least one different archive metadata page in the persistent cache that has not been accessed for at least a threshold period of time, and removes the at least one different archive metadata page from the persistent cache.

17 Claims, 7 Drawing Sheets

(56) References Cited

U.S. PATENT DOCUMENTS

| | | | | |
|---|---|---|---|---|
| 2020/0167236 | A1 | 5/2020 | Gupta et al. | |
| 2021/0064485 | A1* | 3/2021 | Rana | G06F 11/1451 |
| 2021/0133046 | A1 | 5/2021 | Yadav et al. | |
| 2021/0328593 | A1* | 10/2021 | Kesavan | G06F 16/13 |

* cited by examiner

500

SYSTEMS AND METHODS FOR PERFORMING DATA BACKUPS USING A PERSISTENT CACHE

CROSS-REFERENCE TO RELATED APPLICATIONS

This application is a continuation of U.S. Non-Provisional application Ser. No. 18/480,786 filed Oct. 4, 2023, which is herein incorporated by reference.

FIELD OF TECHNOLOGY

The present disclosure relates to the field of data storage, and, more specifically, to systems and methods for performing data backups using a persistent cache.

BACKGROUND

The volume of custom data is growing. At the same time, there is a trend of transferring backups to cloud storage providers. Accordingly, the speed of incremental backups becomes increasingly critical. In order to make incremental backups in an archive, it is necessary to compare the data that is already in the archive (e.g., data previously backed up) with the latest data to be backed up. The amount of existing data that needs to be read from the archive to make an incremental backup can potentially be very large (e.g., if the archive size is 5 TB, then about 3.5 GB needs to be read from it). There are cases when reading data during an incremental backup takes up most of the backup time. Accordingly, in such situations, the backup time will nearly double. Clearly, such backup operations can be quite time consuming and exhaustive in terms of processing. For example, the archive may be physically located in a remote data center or the access speed of the archive may be slow. The operation may also be quite expensive because, if the backup is in the cloud, a cloud provider may charge for reading data.

SUMMARY

Aspects of the disclosure relate to the field of data storage. In particular, aspects of the disclosure describe methods and systems for performing data backups using a persistent cache.

In one exemplary aspect, the techniques described herein relate to a method for performing data backups using a persistent cache, the method including: generating a persistent cache in a volume of a computing device; storing at least one archive metadata page of a plurality of archive metadata pages in the persistent cache, wherein the plurality of archive metadata pages are associated with a plurality of files backed up from a local storage volume of the computing device to an archive; detecting that a file of the plurality of files is modified on the local storage volume; performing an incremental backup of the modified file, by: determining whether an archive metadata page of the modified file is stored in the persistent cache; in response to determining that the archive metadata page of the modified file is included in the at least one archive metadata page, retrieving the archive metadata page from the persistent cache; and executing the incremental backup of the modified file using information in the archive metadata page.

In some aspects, the techniques described herein relate to a method, wherein the plurality of archive metadata pages include information indicating a list of recovery points in the archive, a list of files in each recovery point, a list of parts in each file, and respective locations of the parts in the archive.

In some aspects, the techniques described herein relate to a method, wherein the information in the archive metadata page indicates a recovery point in the archive including parts of an original version of the modified file and locations of the parts in the archive, further including: identifying the locations indicated in the archive metadata page; and uploading parts of the modified file to the locations.

In some aspects, the techniques described herein relate to a method, further including: in response to determining that the archive metadata page of the modified file is not included in the at least one archive metadata page, retrieving the archive metadata page from the plurality of archive metadata pages stored in the archive; and writing the archive metadata page to the persistent cache.

In some aspects, the techniques described herein relate to a method, wherein the volume is resizable, further including: setting a size of the persistent cache to a percentage of a size of the volume; and adjusting the size of the persistent storage in response to detecting a change in the size of the volume.

In some aspects, the techniques described herein relate to a method, wherein the adjusting is proportional to the change in the size of the volume.

In some aspects, the techniques described herein relate to a method, further including: setting a maximum size of the persistent cache; detecting that the maximum size is reached subsequent to storing the at least one archive metadata page; and in response to detecting that the maximum size is reached, identifying at least one different archive metadata page in the persistent cache that has not been accessed for at least a threshold period of time; and removing the at least one different archive metadata page from the persistent cache.

It should be noted that the methods described above may be implemented in a system comprising a hardware processor. Alternatively, the methods may be implemented using computer executable instructions of a non-transitory computer readable medium.

In some aspects, the techniques described herein relate to a system for performing data backups using a persistent cache, including: at least one memory; at least one hardware processor coupled with the at least one memory and configured, individually or in combination, to: generate a persistent cache in a volume of a computing device; store at least one archive metadata page of a plurality of archive metadata pages in the persistent cache, wherein the plurality of archive metadata pages are associated with a plurality of files backed up from a local storage volume of the computing device to an archive; detect that a file of the plurality of files is modified on the local storage volume; perform an incremental backup of the modified file, by: determining whether an archive metadata page of the modified file is stored in the persistent cache; in response to determining that the archive metadata page of the modified file is included in the at least one archive metadata page, retrieving the archive metadata page from the persistent cache; and executing the incremental backup of the modified file using information in the archive metadata page.

In some aspects, the techniques described herein relate to a non-transitory computer readable medium storing thereon computer executable instructions for performing data backups using a persistent cache, including instructions for: generating a persistent cache in a volume of a computing device; storing at least one archive metadata page of a plurality of archive metadata pages in the persistent cache, wherein the plurality of archive metadata pages are associated with a plurality of files backed up from a local storage volume of the computing device to an archive; detecting that a file of the plurality of files is modified on the local storage volume; performing an incremental backup of the modified file, by: determining whether an archive metadata page of the modified file is stored in the persistent cache; in response to determining that the archive metadata page of the modified file is included in the at least one archive metadata page, retrieving the archive metadata page from the persistent cache; and executing the incremental backup of the modified file using information in the archive metadata page.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for performing data backups using a persistent cache. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In order to address the shortcomings of conventional incremental backups described previously, the reading of data from an archive during an incremental backup should be minimized. From a high-level, the present disclosure describes making the minimum necessary cache limited to contain frequently accessed data by a user. The cache may be stored locally, giving a backup agent (or another service) quick access to the cache. During an incremental backup, the backup agent may first look for data in the cache, and only if the data is not found, will the backup agent search in the archive. Using the cache to speed up incremental backups, to speed up access to data inside an archive, and to speed up searches inside an archive is a new approach and a milestone in the development of backup technologies. For example, the disclosed systems and methods may significantly speed up cloud backups as well as the backup of physical machines.

Figure 1:
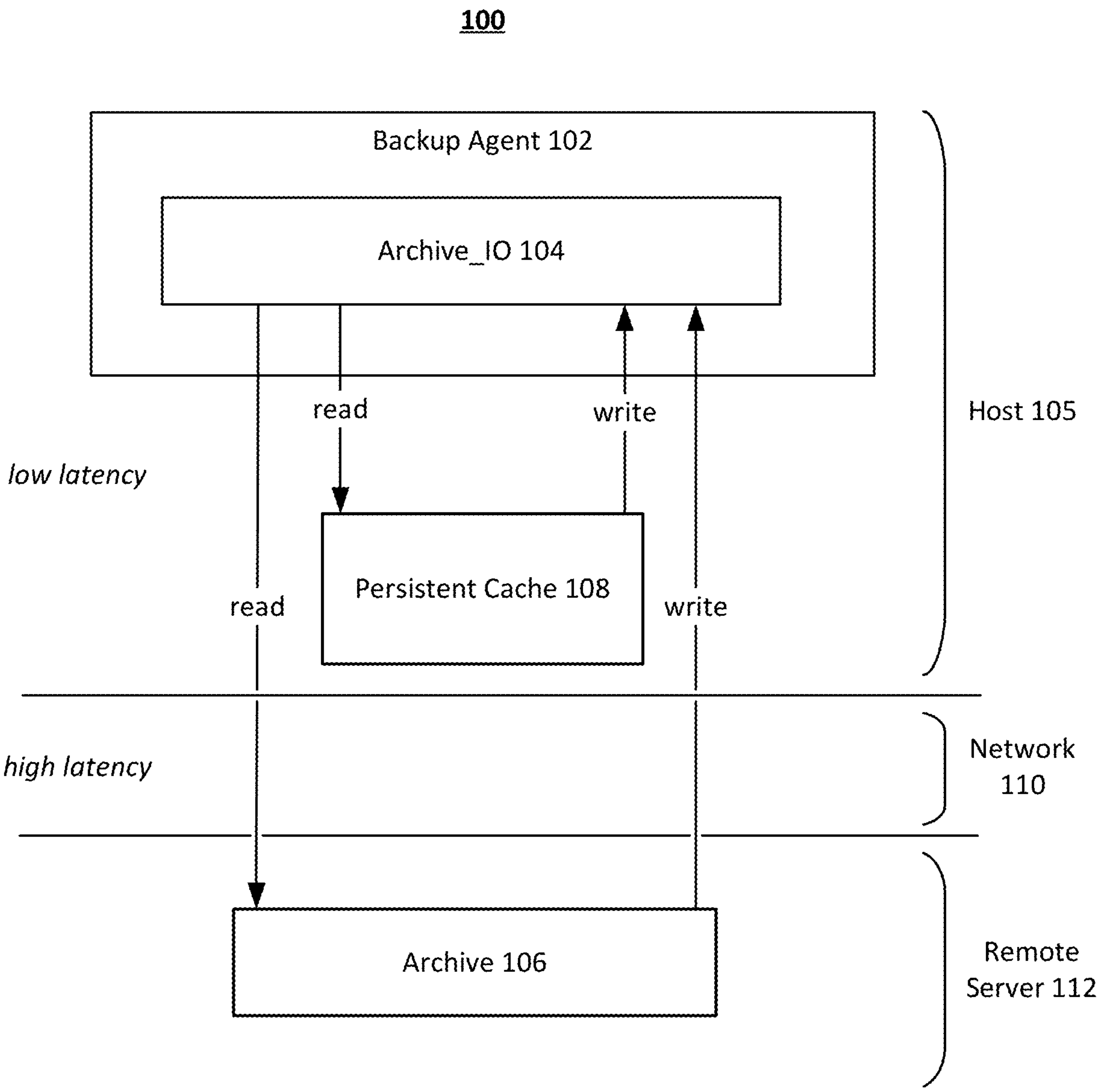
FIG. 1 is a block diagram illustrating a system for performing data backups using a persistent cache.

FIG. 1 is a block diagram illustrating system 100 for performing data backups using a persistent cache. System 100 includes backup agent 102. Backup agent 102 is configured to execute the logic of the backup procedure described in the present disclosure. Backup agent 102 may be a software application that is installed on backup host 105 (e.g., computer system 20 described in FIG. 7). Backup host 105 may have a memory component such as a solid state drive storing local data of the device. This local data may need to be backed up periodically to archive 106, which may on a remote server 112 (e.g., of a cloud network). Remote server 112 may be connected to host 105 via network 110 (e.g., the Internet). Archive_IO 104 is a module of backup agent 102 that is configured to read and write data to archive 106.

Suppose that at time t1, backup agent 102 performs a full backup of data on host 105 to archive 106 (particularly data not in persistent cache 108). As a result of the full backup, archive 106 has a plurality of files that are stored in backup host 105. At time t2, a subset of the plurality of files are changed in backup host 105. For example, one or more documents in the plurality of files may be modified. At time t3, an incremental backup is to be performed of backup host 105 to archive 106. Because only the subset of the plurality of files is changed on backup host 105, only the subset needs to be uploaded to archive 106. However, identifying the subset of files is cumbersome as described previously (i.e., it is necessary to compare the data that is already in archive 106 with the latest data to be backed up).

In one aspect, archive 106 is either an in-memory program representation of TIBX format state, or a TIBX file itself. The TIBX format is developed and used in Acronis™ products. Data in the TIBX format is split into fixed-length chunks called pages. When archive_IO 104 needs to read or write something from/to file, it reads/writes whole pages. In particular, the TIBX format includes two kinds of data: (1) compressed and optionally encrypted user backup data and (2) metadata-information necessary to locate and identify user data inside archive 106.

There are two archive types to consider: tape archive and cloud archive. Firstly, tape positioning is slow. It often requires switching to a particular cassette of the tape archive and rewinding it to find the corresponding data. When performing an incremental backup, metadata from previous backups is used to determine which data has not been changed. When a user browses backups and their files or application data (e.g., tables, etc.), several cassettes may need to be searched in random order-rewinding the tapes back and forth.

In terms of cloud archives, which are usually accessed through the Internet. The internet connection may be rather slow (results in high latency) and typically payable for traffic. Moreover, some third party clouds (e.g., object storages) may additionally charge for traffic. Therefore, the identification process of the subset in either type of archive is inefficient and potentially expensive.

In order to resolve this issue, backup agent 102 utilizes persistent cache 108. In an exemplary aspect, persistent cache 108 is stored in a volume on backup host 105. In an exemplary aspect, persistent cache is a low-latency memory with fast access to data. This makes read/write operations to persistent cache 108 quick and efficient. In some aspects, persistent cache 108 may be used to store metadata (e.g., of the TIBX format) in order to save extra reads from archive 106. In some aspects, the metadata includes a list of recovery points in archive 106, a list of files in each recovery point, a list of parts in each file, and location(s) of each part in archive 106. In a general overview, agent 102 fetches user data (e.g., user files on disks, in databases, etc.) and performs tasks such as deduplication, compression, encryption, etc. To perform these tasks, agent 102 needs information found in metadata.

Backup agent 102 may be configured to limit a total size of persistent cache 108 and a total amount of free space on a disk where persistent cache 108 is generated. This enables for storing an adequate amount of information on persistent cache 108 without running out of space and causing the same backup issues described when having to read directly from archive 106. In some aspects, when volumes are resizable, backup agent 102 may automatically resize persistent cache 108. For example, the size of persistent cache 108 may be set to a percentage (e.g., 10%) of a volume size. Accordingly, whether the volume size increases or decreases, the size of persistent cache 108 is automatically updated. In some aspects, the size of persistent cache 108 may depend on a size of archive 106. For example, the size of persistent cache 108 may be a percentage of a size of archive 106.

In some aspects, backup agent 102 may generate a unique persistent cache for each unique source storage/archive. Accordingly, multiple persistent caches each associated with a different archive may be stored on the same or different volume connected to a particular computer system.

Figure 2:
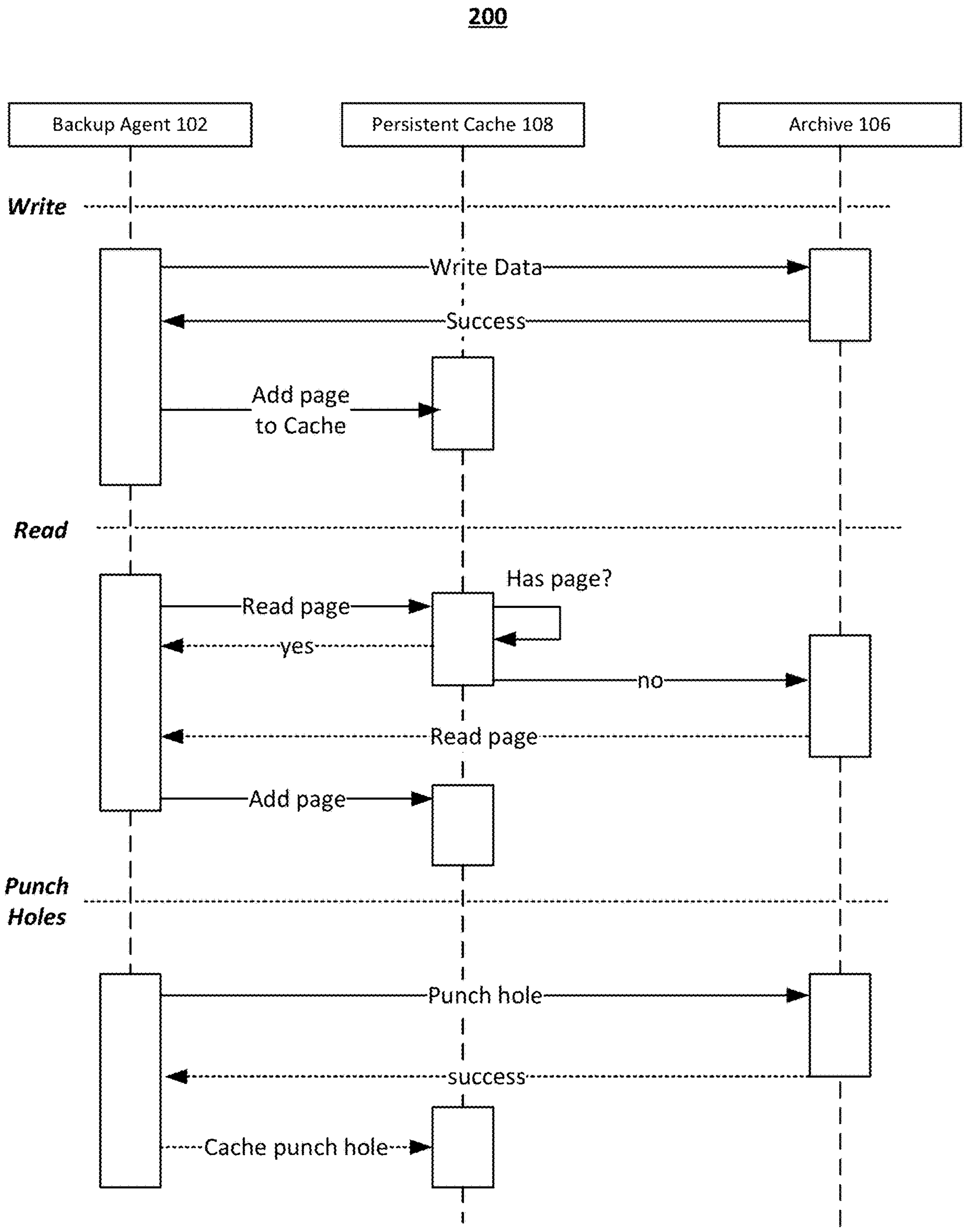
FIG. 2 illustrates a flow diagram of a method for adding pages to the persistent cache.

FIG. 2 illustrates a flow diagram of a method 200 for adding pages to the persistent cache. In general, when backup agent 102 performs a backup, archive metadata of archive 106 needs to be read into memory. If archive 106 is stored far from host 105, reading metadata involves high latency (i.e., waiting for data to travel from remote server 112 to host 105 over network 110).

To minimize latency, archive_IO 104 stores local copies of archive file pages in persistent cache 108. Accordingly, when backup agent 102 needs to read metadata, backup agent 102 can access persistent cache 108 instead of archive 106. This ultimately improves backup times.

Method 200 is partitioned into three phases (write, read, and punch holes). When performing a full backup of data, system 100 is in the write phase. In this phase, backup data is uploaded to archive 106 by writing pages of the backup data to archive 106. Upon a successful upload, archive 106 may transmit an indication to backup agent 102 of a successful upload. It should be noted that at the initiation of the full backup, persistent cache 108 remains empty. However, in some aspects, after a threshold amount of pages have been written to archive 106 (e.g., 500 GB of data or 70% of the full backup), backup agent 102 may also write pages to persistent cache 108. In some aspects, pages are written to persistent cache 108 until the full backup is complete. In some aspects, pages may be written at random to persistent cache 108 when performing a full backup.

Subsequent to backing up a plurality of files to archive 106, backup agent 102 may initiate an incremental backup. Here, system 100 enters the read phase. For example, a document may be modified on host 105 and may be a candidate for backup. Archive_IO 104 may attempt to read a page associated with the document from persistent cache 108. If the page exists in persistent cache 108, the page is successfully read by archive_IO 104 and reading from archive 106 is avoided. However, suppose that the page does not exist in persistent cache 108. In an exemplary aspect, backup agent 102 supports appending archive bypassing the cache instance. More specifically, when persistent cache 108 does not contain a requested page, backup agent 104*a* reads the page from archive 106 and saves it to persistent cache 108.

For example, if the document is modified on host 105 and backup agent 102 attempts to write the modified version to archive 106, backup agent 102 needs to determine where the original document is stored in archive 106. This information may be stored in a page comprising location metadata of the document. Reading the metadata from archive 106 directly is slower and expensive than reading from persistent cache 108. If the metadata is found in persistent cache 108, then backup agent 102 uploads the modified document to archive 106 using the information in the metadata. If the metadata is not found in persistent cache 108, backup agent 102 may retrieve the metadata from archive 106 and store it to persistent cache 108.

Suppose that a file is to be removed from archive 106. In this case, system 100 enters a punch holes phase. In this phase, backup agent 102 may transmit an instruction to punch holes (i.e., enter zeros into the archive data associated with the file). In response to receiving an indication the punch holes instruction has been successfully executed in archive 106, backup agent 102 applies the punch hole instruction to persistent cache 108. In answer to punch whole instruction, persistent cache frees space that was occupied by cached pages inside punched range.

There are a plurality of functional requirements of the systems and methods of the present disclosure. Firstly, system 100 supports append-only archives rather than re-writeable archives. Accordingly, whether archive 106 is a cloud archive or a tape archive, archive 106 is append-only. Furthermore, there is no need to support archive rewrite mode because typically these are rather fast storages, and rewriting data requires, in the case where archive 106 was written to directly while bypassing persistent cache 108, invalidating the whole cache or performing a complicated analysis to determine which pages to invalidate, and re-reading directly from archive 106.

It should be noted that while rewrite mode is not used, backup agent 102 offers no protection from copying or opening archive 106 in rewrite mode. There is no "copy in cloud" and "copy in tape" scenarios. While replication from cloud to local device is possible, the replication generates a new archive Universal Unique Identifier (UUID). If an append-only archive is opened in rewrite mode, it means that the archive was copied from a cloud to local disk (and in this case, a persistent cache is not used). The archive must not be opened later in append mode.

In some aspects, a user of backup host 105 may use initial seeding to generate archive 106. When an Internet connection is too slow to back up large amounts of data or entire machines to cloud storage, initial seeding enables a user to save the first full backup locally and then send it to a cloud provider (e.g., Acronis) for upload. After uploading the initial seeding backup, only the incremental backups to that full backup are uploaded to the cloud. System 100 supports initial seeding. Initial seeding archives are open in rewrite mode, making it a "rewrite and append" scenario. Backup agent 102 does not create persistent cache 108 when writing initial seeding slice(s). After moving archive 106 to a cloud, backup agent 102 starts filling persistent cache 108 from archive 106 in the cloud.

A backup agent 104*a* may use a read ahead feature that enables reading of extra pages that may be not in persistent cache 108. When persistent cache 108 is being used, the read ahead feature should be off.

Figure 3:
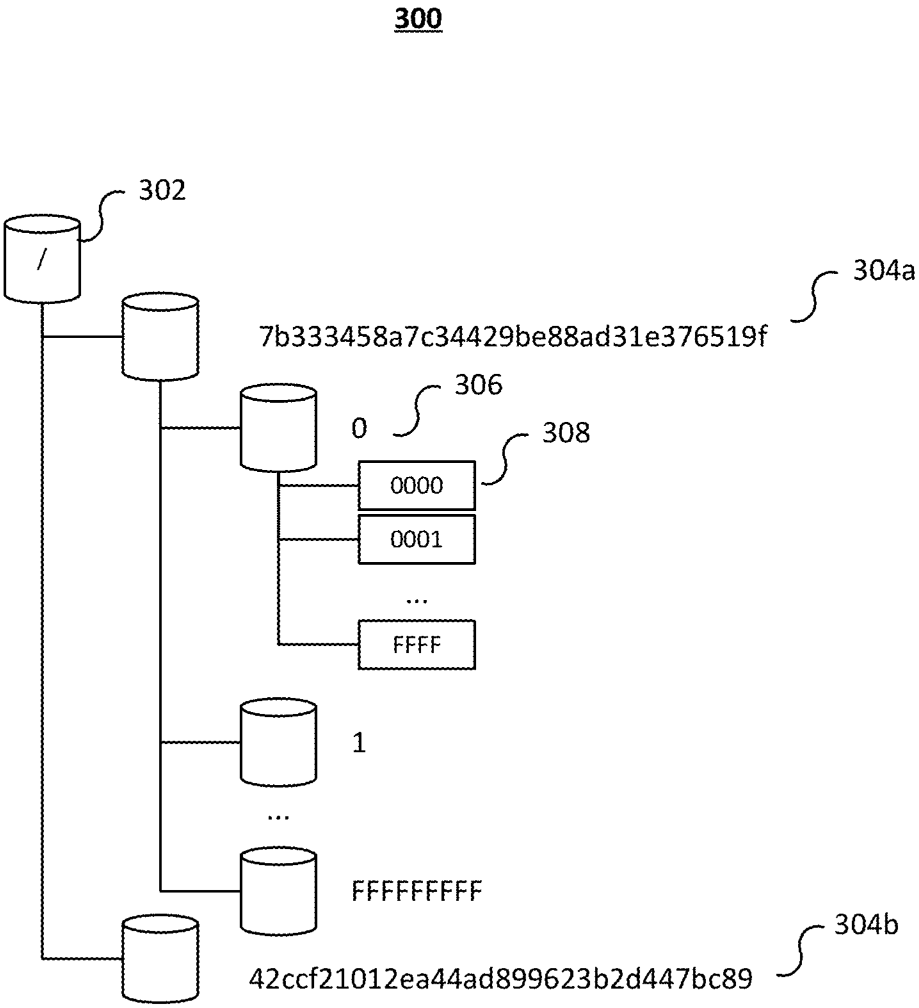
FIG. 3 is a diagram illustrating a structure of the persistent cache.

FIG. 3 is a diagram 300 illustrating a structure of the persistent cache 108. Each cylindrical object in FIG. 3 represents a directory. The cylinder labelled "/" refers to the root directory. Persistent cache 108 has various elements highlighted in FIG. 3. Element 302 points to the root directory of persistent cache 108. Element 304*a* represents an archive UUID (which is used as a directory name) for a first archive. Element 304*b* represents an archive UUID for a second archive. As shown, each archive cache is located in a separate directory.

Element 306 points to a sub-directory (where high bits of start offset are in hex). Element 308 points to a single cache file (lower offset bits in hex). Cached archive pages are stored in archive cache files. In some aspects, the maximum file size is 8 MB+file header size. In some aspects, a sub-directory may include up to 64000 files. Thus, a sub-directory may include up to 64K*8 MB=512 GB of archive data. In an exemplary aspect, all persistent caches reside in the same cache directory. In some aspects, a cache directory is specified to libarchive3 library, before opening the archive.

Figure 4:
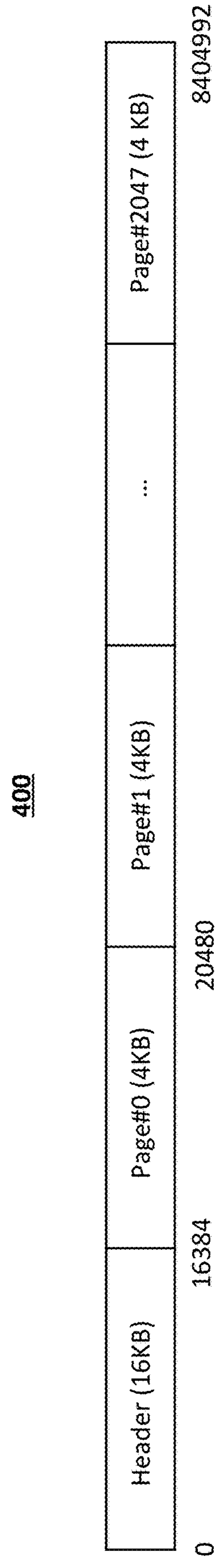
FIG. 4 is a diagram illustrating a general structure of a cache file.

FIG. 4 is a diagram 400 illustrating a general structure of a cache file. In some aspects, each file may include up to 2048 pages and the size of each page may be 4 KB. The header of a cache file may be 16 KB (e.g., the length of four pages). The persistent cache file header includes information on what archive pages from the given region are present in cache, their checksum, and their offsets in persistent cache file. In general, archive metadata is complex, and may not be attributed to a single document. A single archive metadata page may include pieces of information related to several documents. For example, one page may include names of several documents and their unique in-archive identifiers and what backup the documents belong to; another page may include several mappings between document data chunks and in-archive offsets, etc. In some aspects, a single metadata page may not be used without pages as the information for a particular document may be spread across multiple pages.

Figure 5:
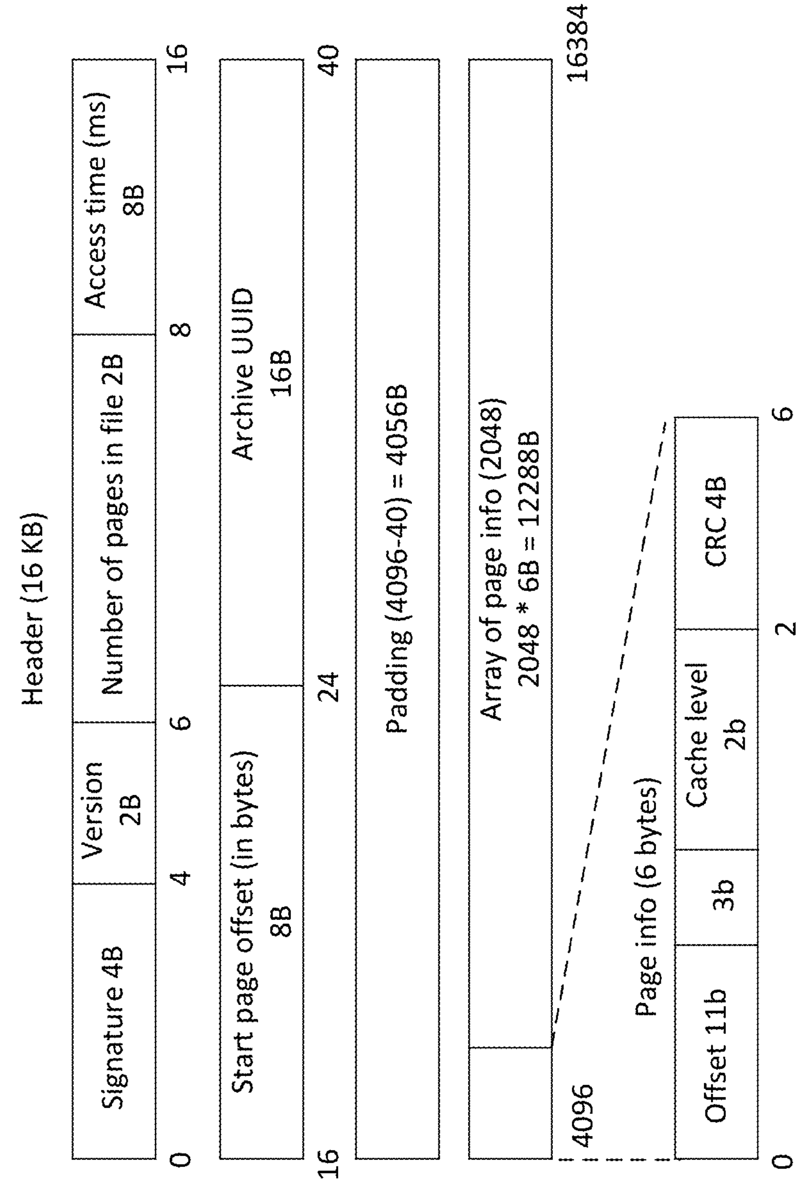
FIG. 5 is a diagram illustrating a header of a cache file.

FIG. 5 is a diagram 500 illustrating a header of a cache file. The header may include a smaller header and an array of 6-byte page infos in the archive. Each page info includes a 16-bit page offset and 32-bit page cyclic redundancy check (CRC). Accordingly, archive_page_offset=start_page_offset+array_of_page_info[i].offset*4K, and file_page_offset=16K+i*4K.

Backup agent 102 may also perform, using an API function, cleanup of persistent cache 108. In some aspects, cleanup is performed on cache level, which is useful especially when using tape archives. In particular, backup agent 102 establishes constraints defining the goal of a cleanup. For example, a constraint may indicate when a cleanup should be performed (e.g., perform a cleanup when archive 106 is opened in rewrite mode, perform a cleanup to enforce a sizing policy such as limiting cache free space). A constraint may also indicate which pages of persistent cache 108 to clean. For example, a constraint may indicate cleaning pages unused (e.g., not read) for a certain period of time (e.g., 1 month) since being last accessed or written in persistent cache 108. Another constraint may indicate to perform the cleanup when a user has requested a cleanup.

Backup agent 102 does not use previous data from persistent cache 108 when an archive page is overwritten in rewrite mode because this breaks data integrity. To ensure data integrity, backup agent 102 will clean up persistent cache 108 after archive 106 is opened in rewrite mode. To ensure that a previous cache is not used, backup agent 102 includes an a cache sequence number in an archive header. When archive 106 is opened in rewrite mode, backup agent 102 increments the cache sequence number. When persistent cache 108 is initialized, the cache sequence number is stored in the cache header. When persistent cache 108 is opened, the cache sequence number from the cache header is compared to the cache sequence number from the archive header. If the cache sequence numbers are not the same, the cache is cleared and reinitialized.

There are various advantages to implementing a data backup using the persistent cache approach described in the present disclosure. For example, the use of the persistent cache reduces network traffic, speeds up backup speed by eliminating read latency, is safe because it works strictly inside a specified directory and guarantees no writes outside of the specified directory. The use makes backups fast and efficient as it involves storing direct copies of (already compressed) archive contents and there is no need for additional processing of cached data. The backup component ensures that the system is self-balancing by applying limits on memory and disk use using automatic cleanup by cache level, age, and disk use. In some aspects, a wide set of metrics may be collected for monitoring and alerting as well.

Figure 6:
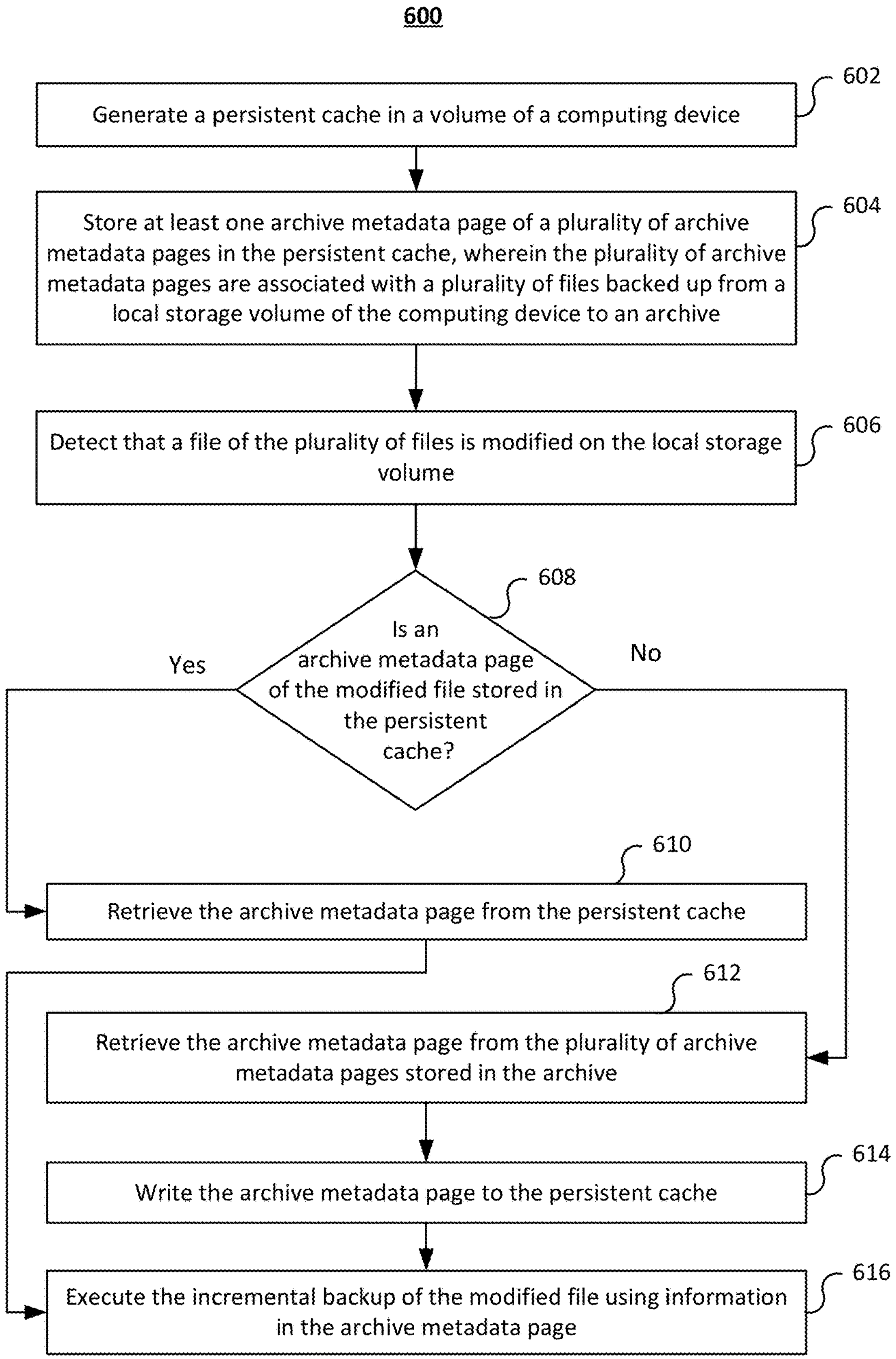
FIG. 6 illustrates a flow diagram of a method for performing data backups using a persistent cache.

FIG. 6 illustrates a flow diagram of a method 600 for performing data backups using a persistent cache. At 602, backup agent 102 generates a persistent cache 108 in a volume of a computing device (e.g., host 105). In some aspects, backup agent 102 sets a size of the persistent cache to a percentage of a size of the volume. Backup agent 102 may adjust the size of the persistent storage in response to detecting a change in the size of the volume. Such adjusting may be proportional to the change in the size of the volume.

At 604, backup agent 102 stores at least one archive metadata page of a plurality of archive metadata pages in the persistent cache 108, wherein the plurality of archive metadata pages are associated with a plurality of files backed up from a local storage volume of the computing device to an archive 106. For example, a full backup of the plurality of files may have been performed to archive 106. During and/or after this full backup, some of the archive metadata pages associated with the backed up files may be written to the persistent cache.

In some aspects, the plurality of archive metadata pages include information indicating a list of recovery points in the archive, a list of files in each recovery point, a list of parts in each file, and respective locations of the parts in the archive.

At 606, backup agent 102 detects that a file of the plurality of files is modified on the local storage volume. In some aspects, backup agent 102*c* makes this detection when initiating a periodic incremental backup after the full backup. At 608, backup agent 102 determines whether an archive metadata page of the modified file is stored in the persistent cache 108.

In response to determining that the archive metadata page of the modified file is comprised in the at least one archive metadata page stored previously in persistent cache 108, at 610, backup agent 102 retrieves the archive metadata page from the persistent cache 108. Otherwise, method 600 advances to 612, where backup agent 102 retrieves the archive metadata page from the plurality of archive metadata pages stored in the archive 106. At 614, backup agent 102 writes the retrieved archive metadata page to the persistent cache 108.

From 614 and 610, method 600 proceeds to 616, where backup agent 102 executes the incremental backup of the modified file using information in the archive metadata page. For example, the information in the archive metadata page may indicate a recovery point in the archive comprising parts of an original version of the modified file and locations of the parts in the archive. Accordingly, backup agent 102 may identify the locations indicated in the archive metadata page, and upload parts of the modified file to the locations.

In some aspects, backup agent 102 may set a maximum size of the persistent cache. Suppose that backup agent 102 detects that the maximum size is reached subsequent to storing the at least one archive metadata page. In response to detecting that the maximum size is reached, backup agent 102 may identify at least one different archive metadata page in the persistent cache that has not been accessed for at least a threshold period of time, and remove the at least one different archive metadata page from the persistent cache.

Figure 7:
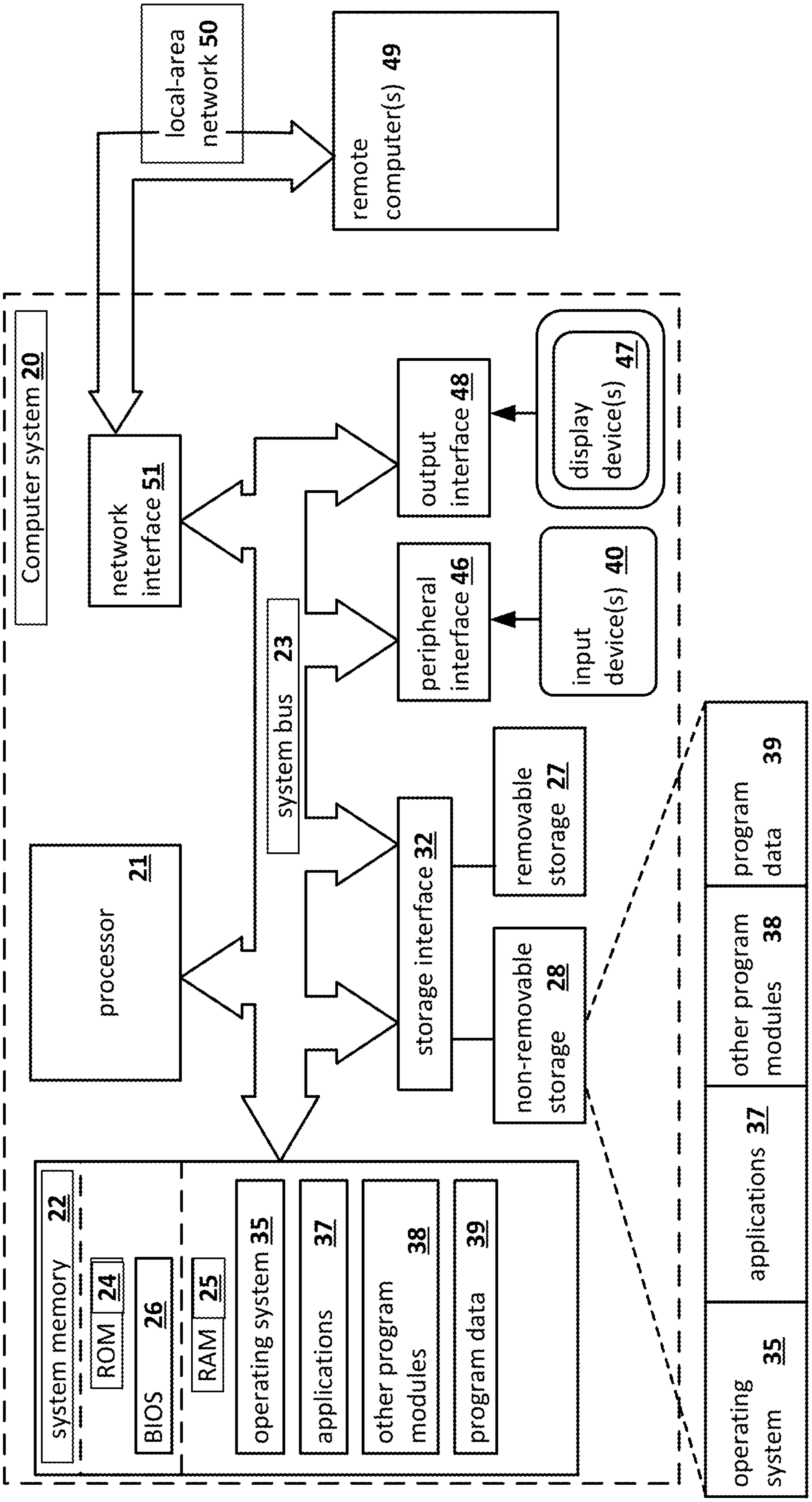
FIG. 7 presents an example of a general-purpose computer system on which aspects of the present disclosure can be implemented.

FIG. 7 is a block diagram illustrating a computer system 20 on which aspects of systems and methods for performing data backups using a persistent cache may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-6 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. In some aspects, persistent cache 108 is established in one or more storage devices 27 and/or 28. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing data backups using a persistent cache, the method comprising:

generating a persistent cache in a volume of a computing device and setting a maximum size of the persistent cache;

storing at least one archive metadata page of a plurality of archive metadata pages in the persistent cache, wherein the plurality of archive metadata pages are associated with a plurality of files backed up from a local storage volume of the computing device to an archive;

detecting that a file of the plurality of files is modified on the local storage volume;

performing an incremental backup of the modified file, by:

determining whether an archive metadata page of the modified file is stored in the persistent cache;

in response to determining that the archive metadata page of the modified file is comprised in the at least one archive metadata page, retrieving the archive metadata page from the persistent cache; and executing the incremental backup of the modified file using information in the archive metadata page;

detecting that the maximum size is reached subsequent to storing the at least one archive metadata page; and in response to detecting that the maximum size is reached, identifying at least one different archive metadata page in the persistent cache that has not been accessed for at least a threshold period of time, and removing the at least one different archive metadata page from the persistent cache.

2. The method of claim 1, further comprising:
detecting that a second file of the plurality of files is modified on the local storage volume; and
performing a second incremental backup of the modified second file.

3. The method of claim 2, wherein performing the second incremental backup comprises:
determining whether an archive metadata page of the modified file is stored in the persistent cache;
in response to determining that the archive metadata page of the modified file is comprised in the at least one archive metadata page, retrieving the archive metadata page from the persistent cache; and
executing the incremental backup of the modified file using information in the archive metadata page.

4. The method of claim 1, wherein the plurality of archive metadata pages include information indicating a list of recovery points in an archive, a list of files in each recovery point, a list of parts in each file, and respective locations of the parts in the archive.

5. The method of claim 1, wherein information in the archive metadata page indicates a recovery point in an archive comprising parts of an original version of a modified file and locations of the parts in the archive, further comprising:
identifying the locations indicated in the archive metadata page; and
uploading parts of the modified file to the locations.

6. The method of claim 1, further comprising:
in response to determining that the archive metadata page of a modified file is not comprised in the at least one archive metadata page, retrieving the archive metadata page from the plurality of archive metadata pages stored in an archive; and
writing the archive metadata page to the persistent cache.

7. The method of claim 1, further comprising:
setting a size of the persistent cache to a percentage of a size of a resizable volume; and
adjusting the size of the persistent cache in response to detecting a change in the size of the resizable volume.

8. The method of claim 7, wherein the adjusting is proportional to the change in the size of the volume.

9. A system for performing data backups using a persistent cache, comprising: at least one memory;
at least one hardware processor coupled with the at least one memory and configured, individually or in combination, to:
generate a persistent cache in a volume of a computing device and setting a maximum size of the persistent cache;
store at least one archive metadata page of a plurality of archive metadata pages in the persistent cache, wherein the plurality of archive metadata pages are associated with a plurality of files backed up from a local storage volume of the computing device to an archive;
detect that a file of the plurality of files is modified on the local storage volume;
perform an incremental backup of the modified file, by:
determining whether an archive metadata page of the modified file is stored in the persistent cache;
in response to determining that the archive metadata page of the modified file is comprised in the at least one archive metadata page, retrieve the archive metadata page from the persistent cache; and
execute the incremental backup of the modified file using information in the archive metadata page;
detect that the maximum size is reached subsequent to storing the at least one archive metadata page; and
in response to detecting that the maximum size is reached, identify at least one different archive metadata page in the persistent cache that has not been accessed for at least a threshold period of time, and remove the at least one different archive metadata page from the persistent cache.

10. The system of claim 9, wherein the at least one hardware processor is further configured to:
detect that a second file of the plurality of files is modified on the local storage volume; and
perform an second incremental backup of the modified second file.

11. The system of claim 10, wherein the at least one hardware processor is further configured to perform the second incremental backup by:
determining whether an archive metadata page of the modified second file is stored in the persistent cache;
in response to determining that the archive metadata page of the modified second file is comprised in the at least one archive metadata page, retrieving the archive metadata page from the persistent cache; and
executing the second incremental backup of the modified file using information in the archive metadata page.

12. The system of claim 9, wherein the plurality of archive metadata pages include information indicating a list of recovery points in an archive, a list of files in each recovery point, a list of parts in each file, and respective locations of the parts in the archive.

13. The system of claim 9, wherein information in the archive metadata page indicates a recovery point in an archive comprising parts of an original version of a modified file and locations of the parts in the archive, wherein the at least one hardware processor is further configured to:
identify the locations indicated in the archive metadata page; and
upload parts of the modified file to the locations.

14. The system of claim 9, wherein the at least one hardware processor is further configured to:
in response to determining that the archive metadata page of a modified file is not comprised in the at least one archive metadata page, retrieve the archive metadata page from the plurality of archive metadata pages stored in an archive; and
write the archive metadata page to the persistent cache.

15. The system of claim 9, wherein the at least one hardware processor is further configured to:
set a size of the persistent cache to a percentage of a size of a resizable volume; and
adjust the size of the persistent cache in response to detecting a change in the size of the resizable volume.

16. The system of claim 15, wherein the adjusting is proportional to the change in the size of the volume.

17. A non-transitory computer readable medium storing thereon computer executable instructions for performing data backups using a persistent cache, including instructions for:
generating a persistent cache in a volume of a computing device and setting a maximum size of the persistent cache;
storing at least one archive metadata page of a plurality of archive metadata pages in the persistent cache, wherein the plurality of archive metadata pages are associated with a plurality of files backed up from a local storage volume of the computing device to an archive;

detecting that a file of the plurality of files is modified on the local storage volume;

performing an incremental backup of the modified file, by:

determining whether an archive metadata page of the modified file is stored in the persistent cache;

in response to determining that the archive metadata page of the modified file is comprised in the at least one archive metadata page, retrieving the archive metadata page from the persistent cache; and executing the incremental backup of the modified file using information in the archive metadata page;

detecting that the maximum size is reached subsequent to storing the at least one archive metadata page; and in response to detecting that the maximum size is reached, identifying at least one different archive metadata page in the persistent cache that has not been accessed for at least a threshold period of time, and removing the at least one different archive metadata page from the persistent cache.

* * * * *